Aug. 26, 1947.   H. D. ISENBERG   2,426,396
FORCE DETERMINING DEVICE
Filed Feb. 21, 1945
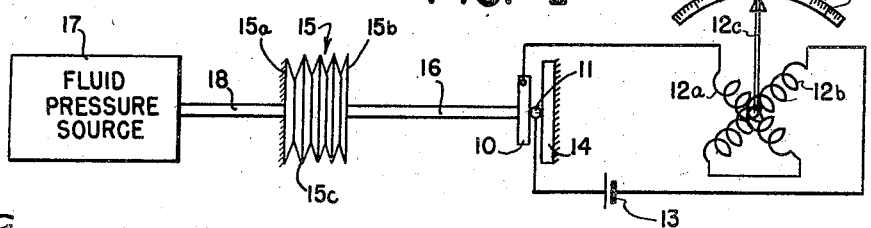
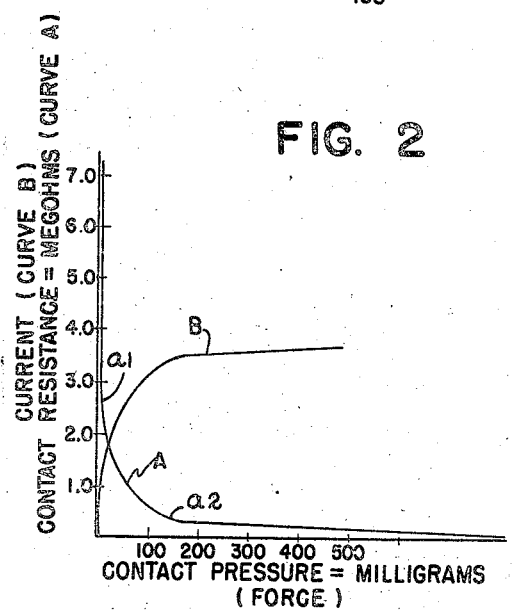
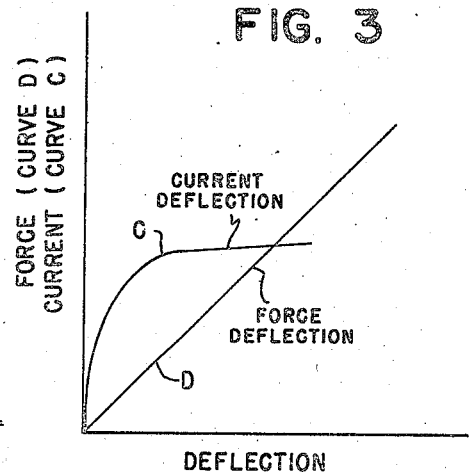
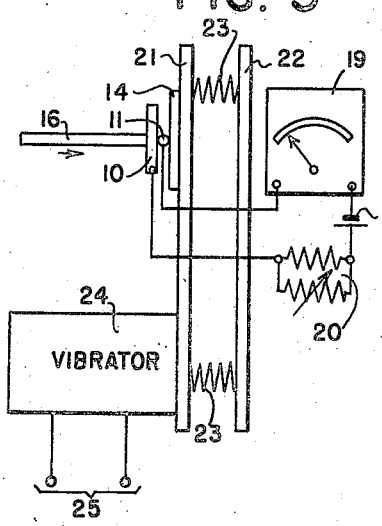
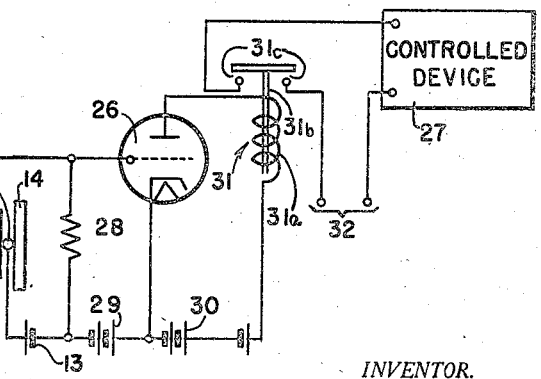
INVENTOR.
HANS D. ISENBERG
BY Mueller, Dodds & Mason
ATTORNEYS.

Patented Aug. 26, 1947

2,426,396

UNITED STATES PATENT OFFICE 2,426,396

FORCE DETERMINING DEVICE

Hans D. Isenberg, Wilmette, Ill.

Application February 21, 1945, Serial No. 579,139

4 Claims. (Cl. 177—351)

1

The present invention relates to an improved device for producing an effect representative of a force and more particularly to improved apparatus for producing a variable effect which is accurately representative of a variable force.

There are many applications requiring accurate and rapid determination of a fixed or variable force. Thus in the measurement of torque and weight, determination of the force applied to a structural member is usually involved in obtaining an indication of the unknown factor. Commercially available measuring devices for determining such factors are predominantly of the all-mechanical type, and conventionally comprise mechanical force translating systems for converting the factor under observation into an effect, i. e., an indication or response, quantitatively representative of the factor. Such devices, if accurate, are expensive to manufacture and calibrate, and frequently require tedious adjustments in the handling thereof in order to obtain accurate results, particularly in the measurement of small quantities. Moreover, the accuracy of such devices is impaired to a limited extent at least by extraneous vibration and by wide changes in the ambient temperature.

It is an object of the present invention, therefore, to provide a simple and reliably accurate device for producing an effect representative of a force.

It is another object of the invention to provide a device of the character described which is very rapid in its response to changes in the force under observation, and is extremely accurate when used to measure small forces.

It is still another object of the invention to provide improved apparatus of the character indicated which produces a response linearly related to the force under observation.

It is a still further object of the invention to provide an improved device of the character described, the accuracy of which is substantially unaffected by extraneous vibration of the device or by variations in the temperature of its component elements.

The invention both as to its organization and method of operation, together with further objects and advantages thereof, will best be understood by reference to the following specification taken in connection with the accompanying drawings, in which:

Fig. 1 is a view schematically illustrating an improved device characterized by the features of the present invention and arranged to indicate the pressure of a fluid pressure source;

Fig. 2 is a graph illustrating certain character-

2 istics of one of the elements embodied in the device;

Fig. 3 is a graph illustrating certain characteristics of another element of the device;

Fig. 4 schematically illustrates another embodiment of the invention in which the effect produced by the device is utilized for control purposes; and Fig. 5 is a view schematically illustrating a further modification of the device in which facilities are provided for preventing extraneous vibration from affecting the accuracy of the device.

Referring now to the drawings and more particularly to Fig. 1 thereof, the present invention is there illustrated in its embodiment in a device for measuring and indicating the pressure of a fluid pressure source 17, such, for example, as a steam generator or the like, having a pressure chamber which is fluid connected with a Sylphon bellows assembly 15 through a conduit 18. This assembly comprises the usual corrugated Sylphon element 15c, the ends of which are closed by closure members 15a and 15b. The first of these members is fixedly mounted in any suitable manner to prevent movement thereof, and the other member 15b is free to move back and forth along the longitudinal axis of the bellows element 15c in response to changes in the pressure within this element.

In brief, the present improved device for measuring and indicating the pressure developed within the bellows elements 15c comprises a pair of electrically conductive contacts 10 and 11, which are in the form of crossed rods of round cross section, having a contact resistance when engaged which is a predetermined function of the magnitude of the contact pressure therebetween. The contact 11 is rigidly mounted upon a conductive base 14 which in turn is fixedly anchored against movement. Means comprising a rigid force transmitting member 16, upon which the contact 10 is fixedly mounted, are provided for producing a contact pressure between the two identified contacts which is determined by the force exerted longitudinally of the member 16 to thrust the contact 10 against the contact 11. In the illustrated arrangement, this force is obviously equal to the pressure per unit area within the fluid source 17 times the area of the bellows closure member 15b. If required, however, any desired form of force dividing mechanism having a linear input force-output force characteristic may be interposed between the bellows member 15b and the contact 10 to produce a contact pressure between the contacts 10 and 11 which is fractionally and yet linearly related to the pressure of the source 17. Such a mechanism may be necessary in certain applications in order to limit the pressure between the contacts 10 and 11 to values within the usable portion of the contact pressure-contact resistance characteristic of the contacts in the manner explained below. The device further comprises electrical means controlled in accordance with the contact resistance of the contacts 10 and 11 for producing an effect, i. e., a visual indication, representative of the force applied longitudinally of the member 16 by the bellows element 15c. These electrical facilities comprise a voltage source 13, illustrated as a battery of low voltage, and a galvanometer 12 of the well known dynamometer type. Specifically, this galvanometer comprises a fixed coil 12b, a movable coil 12a, and an indicating element 12c adapted to coact with a suitable calibrated scale 12d to provide an indication of the magnitude of current flow through the series connected coils 12a and 12b. These coils are connected in series with the contacts 10 and 11 across the terminals of the voltage source 13, so that the current flow therethrough is a function of the contact resistance between the two identified contacts.

As will be evident from the above description of the device, the fluid pressure within the source 17 is translated into a force thrusting the contact 10 against the contact 11 through the action of Sylphon bellows 15 and the force transmitting member 16. Thus the contact pressure between the contacts 10 and 11 is determined by, and varies in accordance with the force acting along the member 16, and hence the pressure of the source 17. At each predetermined value of contact pressure, the contacts 10 and 11 have a corresponding contact resistance. Accordingly, the current flow through the windings 12a and 12b of the galvanometer 12, and hence the deflection of the indicating element 12c along the scale 12d, is determined by the pressure within the source 17 and is varied in accordance with changes in this pressure. By suitable calibration of the scale 12d, therefore, the elements 12c and 12d are caused to coact in providing a directly readable indication of the pressure within the source 17, or the force applied to the member 16.

More specifically considered, the configuration of the contact resistance-contact pressure characteristic of the crossed contact rods 10 and 11 is typified by the curve A shown in Fig. 2 of the drawings. This curve is a quantitatively accurate representation of the contact resistance-contact pressure characteristic for a pair of crossed contact rods formed of brass and having outside diameters of .15625 inch and .32205 inch, respectively. From an inspection of this curve, it will be observed that within the portion a1—a2 of this curve which may be used in translating force into an effect or indication, the curve is essentially non-linear. Specifically, this portion of the curve follows an inverse square root law and accurately conforms to the expression:

$$R = \frac{C}{\sqrt{P}}$$

where:

R = Contact resistance in ohms.
P = Contact pressure in any unit weight.
C = A constant which is dependent upon the shape of the contacts, the material from which the contacts are made, the voltage applied across the contacts, and the system of weights used in determining P.

In determining the curve A, a direct current voltage source of 1.2 volts was employed. Neglecting the external resistance of the circuit in which the contacts 10 and 11 are serially included, which resistance is very small as compared with the contact resistance of the contacts over the portion a1—a2 of the curve A, the contact current-contact pressure characteristic B of the contacts, and hence of the circuit, is essentially the inverse of the described contact pressure-contact resistance characteristic. In other words, this characteristic curve also follows a square root law in that it satisfies the expression:

$$I = \frac{E\sqrt{P}}{C}$$

where:

E = The applied voltage, and
I = Current through the contacts.

It is apparent, therefore, that if an instrument 12 having a linear current-indication response characteristic is used to translate the current in the indicating circuit into an indication of the force thrusting the contact 10 against the contact 11, non-linear calibration of the instrument scale 12d must be relied upon to compensate for the non-linearity of the curve B.

In accordance with a particular feature of the present invention, a linear relationship between the magnitude of the force thrusting the contact 10 against the contact 11 and the deflection of the galvanometer 12 is obtained by employing a galvanometer of the dynamometer type described above. This instrument is a square law instrument in that the deflection of the indicating element is a function of the square of the current through the coils thereof. In general, the relationship between these factors is defined by the expression:

$$D = KI^2$$

or $$I = \sqrt{\frac{D}{K}} = \frac{\sqrt{D}}{K'}$$

where:

D = Deflection of the instrument indicating element.
K = Constant of the instrument.
K' = A new constant obtained by removing K from beneath the square root sign.

Relating the contact pressure between the contacts 10 and 11 to deflection of the instrument indicating element 12c relative to the scale 12d, the expression is obtained:

$$\sqrt{P} = \frac{C\sqrt{D}}{EK'}$$

Since C, E and K' are constants, the expression $$\frac{C}{EK'}$$

may be resolved into a single constant K'' which is obtained by squaring the value $$\frac{C}{EK'}$$

and removing the factors P and D from beneath the square root signs. Thus, the relationship between P and D may be expressed:

$$P = K''D$$

Since P is equal to the force acting along the member 16, $$F = K''D$$

It is apparent, therefore, that when an instrument 12 having a square law current-deflection characteristic is employed, the relationship between the force thrusting the contact 10 against the contact 11 and the resulting deflection of the instrument indicating element 12c becomes substantially linear. Graphically, the current-deflection characteristic of the instrument 12 as shown at C in Fig. 3, should correspond in pattern to the current-pressure characteristic B of the contacts 10 and 11 and hence is the inverse of the contact pressure-contact resistance characteristic A. Under such circumstances, the force-deflection characteristic of the device as indicated at D in Fig. 3 becomes absolutely linear. Hence a linearly calibrated scale 12d may be provided in the instrument 12 to produce an effect, i. e., an indication, representative of the force acting along the member 16.

In the arrangement illustrated in Fig. 4 of the drawings, the present improved device is utilized to effect response of a controlled device 27 when the force acting along the force transmitting member 16 reaches a predetermined value. In this embodiment of the device, the contacts 10 and 11 are connected in series with a biasing resistor 28 across the voltage source 13 to vary the bias potential between the input electrodes of a control tube 26. The space current path through this tube is arranged in series circuit relationship with the winding 31a of a control relay 31 and a source of space current 30. The relay 31 also includes an armature 31b for closing the normally open contacts 31c associated therewith when current flow through the winding 31a reaches a predetermined value. A "C" battery 29 serially associated with the biasing resistor 28 between the input electrodes of the tube 26 is also provided normally to bias the tube to a threshold point at which current flow through the winding 31a is slightly less than that required to effect operation of the armature 31b to close the contacts 31c. In the operation of the Fig. 4 arrangement, an increase in the force applied to the force transmitting member 16 to a predetermined value has the effect of increasing the contact pressure and hence lowering the contact resistance of the contacts 10 and 11 to increase the current flow through the biasing resistor 28. The voltage drop through this resistor opposes the fixed voltage of the bias voltage source 29, so that when current flow through the resistor reaches a predetermined value representative of a predetermined force applied to the member 16, the space current flow between the output electrodes of the tube 26 is sufficient to effect operation of the relay 31. In operating, the armature 31b of this relay is actuated to close the contacts 31c and thus complete an obvious circuit for energizing of the actuating winding of the controlled device 27 from the current source 32. When its winding is thus energized, the device 27 operates to perform its assigned control function. Illustrative of the use of the Fig. 4 embodiment of the invention, is the provision of an electromagnetic valve 27 to control the withdrawal of fluid from the source 17 when the pressure of this source reaches a predetermined value.

One of the problems involved in maintaining the accuracy of the device when it is used to measure exceedingly small forces is that of preventing extraneous vibration of the device from changing the contact resistance of the contacts 10 and 11 within such wide limits as to preclude an accurate determination of the force under observation. Such extraneous vibration forces may be transmitted to the contacts 10 and 11 through the base 14 upon which the stationary contact 11 is fixedly mounted or through the parts of the force transmitting mechanism comprising the member 16. In order to obviate this difficulty, and to obtain an indication on the measuring instrument which is substantially independent of extraneous vibratory forces acting upon the contact assembly, the arrangement illustrated in Fig. 5 of the drawings is provided. As there shown, the contact supporting base 14 is fixedly mounted upon a platform 21 which in turn is spring mounted by means of coil springs 23 upon a supporting structure 22 subject to extraneous vibration. The platform 21 also fixedly supports an electro-mechanical vibrator 24 which is adapted for energization from a suitable current source indicated by the bracketed terminals 25, and is utilized to oscillate the contact 11 at a fixed predetermined rate in the direction along which the contacts 10 and 11 are engaged. For maximum effectiveness in rendering the response of the device independent of extraneous vibratory forces, the springs 23 should each have a very low spring constant, and the vibratory force produced by the vibrator 24 should have a frequency and amplitude substantially greater than the highest frequency and largest amplitude of any extraneous vibratory force acting upon the supporting structure 22. Preferably the vibrator 24 has a vibrating frequency of the order of 200 cycles per minute. Further, the natural resonant frequency of the moving system comprising the platform 21 and the parts carried thereby should be substantially higher than the highest frequency of any extraneous vibratory force acting upon the supporting structure 22. For reasons pointed out more fully below, it is preferable to use, in the Fig. 5 embodiment of the invention, an indicating instrument, such, for example, as a D'Arsonval galvanometer, having a linear current-deflection characteristic. An instrument 19 of this character is shown as having its moving coil connected in series with the contacts 10 and 11 and an adjustable calibrating shunt 20 across the terminals of the source 13.

As will be apparent from the preceding explanation, with the vibrator 24 in operation, vibratory forces are transmitted through the platform 21 and the contact base 14 which serve periodically to vary the contact pressure between the contacts 10 and 11 at the predetermined rate of vibration of the vibrator. Such forced vibration of the platform 21 and the springs 23 minimize the effects of the spurious vibratory forces acting upon the supporting structure 22. Thus the contact pressure produced by the force acting along the member 16 is periodically varied about a mean value representative of this force, through the action of the vibratory force transmitted to the contact 11 by the vibrator 24. The contact pressure between the contacts 10 and 11 and hence the contact resistance therebetween is, therefore, rendered substantially independent of the extraneous vibratory forces. Further, since this contact pressure is varied, through the action of the vibrator 24, about a mean value which is accurately representative of the force under observation and applied to the member 16, the contact resistance between the contacts 10 and 11 is correspondingly varied about a mean value which is determined by the force under observation and is substantially independent of the extraneous vibratory forces. As a result, a direct current having a pulsating component is caused to flow in the circuit including the moving coil of the galvanometer 19. As is characteristic of such devices, the galvanometer 19 is essentially an integrating instrument, such that the indicating element assumes a position accurately representative of the mean value of the current traversing its moving coil. Thus, the indicating element of the instrument assumes a setting which is accurately indicative of the force acting upon the contact 10 through the structural member 16. Suitable calibration of the instrument scale may be employed to provide for direct reading of the force applied to the member 16. The reason for providing an instrument 19 having linear current-deflection characteristic now becomes apparent. Thus, if an instrument of the character of the galvanometer 12, having a square law current-deflection characteristic, is employed, the indicating element of the instrument tends to assume a setting representative of the root mean square value of current traversing the coil of the instrument, rather than a setting representative of the mean value of current flow therethrough. Thus, an inaccurate indication would be provided by the indicating element of such an instrument, in the absence of peculiar calibration. By providing an instrument 19 having the described linear current-deflection characteristic, however, this problem is obviated. Further, this type of instrument is well suited to the use of an adjustable shunt 20 serially included in the circuit of its moving coil for calibration purposes or to provide for scale multiplication which permits different force ranges to be measured with the same instrument.

While there have been described what are at present considered to be the preferred embodiments of the invention, it will be understood that various modifications may be made therein which are within the true spirit and scope of the invention as defined in the appended claims.

I claim:

1. Apparatus for producing an effect representative of a force, comprising a pair of electrically conductive contacts having a predetermined contact pressure-contact resistance characteristic when engaged capable of being represented by a curve other than a straight line, means for producing a contact pressure between said contacts which is determined by said force, a current responsive device for producing said effect having a current-effect characteristic which is capable of being represented by a curve other than a straight line and which characteristic is substantially the inverse of said contact pressure-contact resistance characteristic, and means for passing a current through said device which varies in accordance with variations in the contact resistance between said contacts, thereby to produce a response of said device which is representative of said force.

2. Apparatus for producing an effect representative of a variable force, comprising a pair of electrically conductive contacts having a predetermined contact pressure-contact resistance characteristic when engaged capable of being represented by a curve other than a straight line, means for producing a contact pressure between said contacts which varies in accordance with variations in said force, current responsive means for producing said effect, and means for passing a current through said current responsive means which varies in accordance with variations in the contact resistance between said contacts, thereby to produce a response of said current responsive means which is representative of said force, said current responsive means having a current-effect characteristic which is substantially the inverse of said contact pressure-contact resistance characteristic, whereby the response of said current responsive means bears a substantially straight line relationship with respect to variations in said force.

3. Apparatus for producing an effect representative of a variable force, comprising a pair of electrically conductive contacts having a square law contact pressure-contact resistance characteristic when engaged, means for producing a contact pressure between said contacts which varies in accordance with variations in said force, current responsive means for producing said effect, and means for passing a current through said current responsive means which varies in accordance with variations in the contact resistance between said contacts, thereby to produce a response of said current responsive means which is representative of said force, said current responsive means having a square law current-effect characteristic which is substantially the inverse of said contact pressure-contact resistance characteristic, whereby the response of said current responsive means bears a substantially straight line relationship with respect to variations in said force.

4. Apparatus for producing an effect representative of a variable force, comprising a pair of electrically conductive contacts having a square law contact pressure-contact resistance characteristic when engaged, means for producing a contact pressure between said contacts which varies in accordance with variations in said force, and a circuit including said contacts and means controlled by the current in said circuit for producing an effect representative of said force, said circuit having a square law current-effect characteristic which is substantially the inverse of said contact pressure-contact resistance characteristic, whereby the response of said last-named means bears a substantially straight line relationship with respect to variations in said force.

HANS D. ISENBERG.

REFERENCES CITED

The following references are of record in the file of this patent:

UNITED STATES PATENTS

| Number | Name | Date |
|---|---|---|
| 749,854 | Fahrney | Jan. 19, 1904 |
| 1,814,465 | Becq | July 14, 1931 |
| 1,695,295 | Rollins | Dec. 18, 1928 |
| 2,210,685 | Oman | Aug. 6, 1940 |
| 1,131,202 | Boyden | Mar. 9, 1915 |

FOREIGN PATENTS

| Number | Country | Date |
|---|---|---|
| 555,686 | Germany | July 29, 1932 |

OTHER REFERENCES

Journal of the Institute of Electrical Engineers (British), July 1945, page 287 (201–48P). (Copy available in Div. 60, Patent Office.)